# United States Patent Office 3,330,764
Patented July 11, 1967

3,330,764
POLYGLYCOL ESTERS
Robert J. Nankee, Midland, Mich., assignor to The Dow Chemical Company, Midland, Mich., a corporation of Delaware
No Drawing. Original application June 15, 1962, Ser. No. 202,722, now Patent No. 3,206,486. Divided and this application June 4, 1965, Ser. No. 474,196
2 Claims. (Cl. 252—76)

This case is a division of application Serial No. 202,722, now Patent No. 3,206,486.

This invention relates to long-chain unsaturated fatty acid monoesters of polyoxypropylene-polyoxyethylene block copolymer glycols, to improve methods for making such esters and to brake fluids and lubricants comprising said esters.

Brake fluids must meet many requirements, among the most critical of which are lubricity, non-corrosiveness and compatibility with other commercial brake fluids. Failure in any one of these properties rules out a fluid regardless of its score on other properties. The fluids of the present invention are outstanding in the above properties, in addition to amply meeting all other commercial and military requirements.

The polyglycol esters of this invention are those having the formula:

$$\text{RCOO(PO)}_m\text{—(EO)}_n\text{—H}$$

wherein R is a straight-chain aliphatic hydrocarbon radical containing 17 carbon atoms and 1 to 2 olefinic double bonds, P is a 1,2-propylene radical, E is an ethylene radical, $m$ is an integer about 10 to 20, $n$ is an integer about 3 to 8 and the ratio $m/n$ is about 2.2 to 4.3.

Esters of the above type are most conveniently made by condensing a fatty acid having the formula RCOOH, such as oleic or linoleic acid, or a mixture of such acids, with about 10 to 20 molecular equivalents of propylene oxide and then condensing the thus formed product with about 3 to 8 molecular equivalents of ethylene oxide. The general technique of carrying out such a synthesis, as well as alternative syntheses, are well known in the art. Particularly valuable esters of the above type are those in which the acyl radical, RCO—, is derived from tall oil fatty acids. Such acids are derived from tall oil and consist of at least about 90 percent of fatty acid, the predominant constituents of which are oleic and linoleic acids. Other sources of suitable acids include the unsaturated fractions of lard, tallow, corn oil, cottonseed oil and the like.

The most widely used process for condensing an alkylene oxide with a compound containing an active hydrogen atom, a fatty acid being a typical such compound, is to contact the reactants at a suitable temperature, such as about 50° to 200° C., in the presence of an alkali catalyst. The alkali may then be left in the final product if its presence is unobjectionable. More often it is neutralized by reaction with an acid, an alkyl halide, an alkylene halohydrin or the like. The alkali catalyst is usually sodium or potassium or the oxide, hydroxide or a lower alkoxide of one of these alkali metals. While such neutralization processes are adequate to adjust the pH of the product to the desired value, they are in general objectionable because they produce as a by-product a salt that is often difficult to separate from the product. Such salts are frequently of a corrosive nature and may also exert an undesirable influence on the reactions and properties of the product in its later uses.

It is a special feature of the present invention that when a fatty acid, such as tall oil, is condensed with an alkylene oxide in the presence of an alkali catalyst, the above difficulties arising from the presence of the catalyst in the product can be readily avoided by neutralizing the catalyst by reaction with more of the same or a similar fatty acid. The by-product of such neutralization is the alkali metal salt of the fatty acid and is in general soluble in the product and contributes no undesirable properties thereof. Indeed, when the product is to be used in brake fluids, the presence of the fatty acid salt is actually an advantage since it contributes lubricity and inhibits metal corrosion by the brake fluid. In a preferred embodiment of this aspect of the invention, potassium oxide, hydroxide or alkoxide is mixed with tall oil fatty acid, propylene oxide and ethylene oxide are then condensed with the acid in sequence, and finally the catalyst is neutralized by the addition of approximately the stoichiometric amount of tall oil acid. The product thus obtained, containing about 0.1 to 2 percent by weight of the fatty acid salt, is exceptionally effective as a lubricant in brake fluids and similar hydraulic fluids and lubricants.

The practice of the invention is illustrated by the following examples.

One molecular equivalent of tall oil fatty acid (90 percent fatty acid content; predominantly oleic and linoleic acids) was placed in a reactor, 0.04 percent by weight of KOH was added, the reactor was heated to 125° C. and held at this temperature while 14.1 molecular equivalents of propylene oxide were sparged into the reaction mixture. When all the propylene oxide had reacted, 4.7 molecular equivalents of ethylene oxide were similarly added.

When the above reactions were completed, the catalyst was neutralized by the addition of tall oil fatty acid to a pH of 6.5 as measured in a 50 percent solution in 1:1 methanol-water. The product was then devolatilized under vacuum.

The final product was an oily liquid having a viscosity of 90.0 centistokes at 100° F. and 15.3 centistokes at 210° F. and a viscosity index of 144. Its pour point was −30° F., at which point it remained clear.

A typical brake fluid based on the above product is as follows:

| Component: | Parts by wt. |
|---|---|
| The above tall oil ester | 12 |
| Polypropylene glycol (mol. wt. 4000) | 8 |
| Dipropylene glycol | 10 |
| 2-Ethoxyethoxyethanol | 70 |

The above tall oil esters exhibit exceptional lubricity, especially in the "stick-slip" test. This test evaluates both the static (stick) and the kinetic (slip) friction between intermittently moving surfaces, such as, for example, the movement of a piston in a cylinder. In addition, they are compatible with all commercial brake fluids, have very little swelling effect on rubber and are non-corrosive to the common metals used in hydraulic systems.

Similarly valuable esters are obtained as described above by the block polymerization of 10 to 20 moles of propylene oxide followed by 3 to 8 moles of ethylene oxide, these oxides being sequentially condensed with tall oil fatty acids or with other similar fatty acids containing 1 to 2 olefinic double bonds. In choosing the proportions of the two alkylene oxides it is important to have the ratio of the two within the range of about 2.2 to 4.3 because it is below 2.2 the product has an undesirably high pour point. On the other hand, when the ratio exceeds about 4.3 the product becomes less compatible with other common brake fluid components, tolerates less water and also has a greater tendency to swell rubber.

I claim:
1. A composition of matter consisting essentially of (a) an ester having the formula

$$RCOO(AO)_m-(EO)_n-H$$

wherein RCO is an acyl radical of a tall oil fatty acid, A is a 1,2-propylene radical, E is an ethylene radical $m$ and $n$ are integers, $m$ being 10–20, $n$ being 3–8 and $m/n$ being 2.2 to 4.3, and (b) about 0.1 to 2% by weight, based on said ester, of an alkali metal salt of a tall oil fatty acid.

2. A composition as defined in claim 1 wherein the alkali metal is potassium.

References Cited
UNITED STATES PATENTS

| | | |
|---|---|---|
| 2,395,971 | 3/1946 | Loder. |
| 2,677,700 | 5/1954 | Jackson et al. |
| 2,944,976 | 6/1960 | Waters et al. _____ 252—76 |
| 2,947,699 | 6/1960 | Wasson et al. _____ 252—76 |
| 3,036,130 | 5/1962 | Jackson et al. _____ 252—89 X |
| 3,117,929 | 1/1964 | McCoy et al. _____ 252—76 X |

LEON D. ROSDOL, *Primary Examiner.*

JULIUS GREENWALD, SAMUEL H. BLECH,
*Examiners.*

J. T. FEDIGAN, *Assistant Examiner.*